United States Patent [19]

Namba et al.

[11] Patent Number: 5,072,782
[45] Date of Patent: Dec. 17, 1991

[54] METHOD OF PRODUCING PATTERN FOR MOLDING CASTINGS

[75] Inventors: Takaoki Namba; Teruo Kamada, both of Saitama, Japan

[73] Assignee: Honda Giken Kogyo Kabushiki Kaisha, Tokyo, Japan

[21] Appl. No.: 376,392

[22] Filed: Jul. 6, 1989

[30] Foreign Application Priority Data

Jul. 8, 1988 [JP] Japan .................. 63-170094
Jul. 8, 1988 [JP] Japan .................. 63-170095

[51] Int. Cl.$^5$ .............................. B22C 7/00
[52] U.S. Cl. ....................... 164/45; 164/34; 364/474.24
[58] Field of Search .......... 164/45, 246, 249, 34-36; 364/474.24, 474.26

[56] References Cited

U.S. PATENT DOCUMENTS

| | | | |
|---|---|---|---|
| 3,534,396 | 10/1970 | Hart et al. | 364/474.24 |
| 3,635,280 | 1/1972 | Parsons . | |
| 4,518,288 | 5/1985 | Cilindro | 164/45 |
| 4,615,204 | 10/1986 | Yamamoto et al. . | |
| 4,640,333 | 2/1987 | Martin et al. . | |
| 4,697,240 | 9/1987 | Cedar et al. | 364/474.24 |
| 4,725,960 | 2/1988 | Shima et al. | 364/474.26 |

FOREIGN PATENT DOCUMENTS

| | | |
|---|---|---|
| 0074800 | 3/1983 | European Pat. Off. . |
| 0273608 | 7/1988 | European Pat. Off. . |
| 79039 | 5/1982 | Japan .................. 164/45 |
| 47620 | 10/1986 | Japan .................. 164/45 |
| 62-14208 | 1/1987 | Japan . |
| 62-182806 | 8/1987 | Japan . |
| WO7900795 | 10/1979 | PCT Int'l Appl. . |
| 393484 | 6/1933 | United Kingdom . |
| 1115087 | 5/1968 | United Kingdom . |
| 1228711 | 4/1971 | United Kingdom . |
| 1349121 | 3/1974 | United Kingdom . |
| 1593224 | 7/1981 | United Kingdom . |
| 2083393 | 3/1982 | United Kingdom . |
| 2175523 | 12/1986 | United Kingdom . |

Primary Examiner—Richard K. Seidel
Assistant Examiner—Edward A. Brown
Attorney, Agent, or Firm—Irving M. Weiner; Joseph P. Carrier; Pamela S. Burt

[57] ABSTRACT

A pattern for molding a die having a shaping panel and an attachment panel is produced by drawing a first rib figure extending from the shaping panel of the die based on configuration figure data which are entered manually or through data transfer into a computer-aided design system based on the configuration of a product, drawing a second rib figure extending from the attachment panel of the die in view of a relationship to a press machine which incorporates the die, and joining the first and second rib figures to each other thereby drawing an entire die figure.

4 Claims, 4 Drawing Sheets

METHOD OF PRODUCING PATTERN FOR MOLDING CASTINGS

BACKGROUND OF THE INVENTION

1. Field of the Invention

The present invention relates to a method of producing a pattern for molding castings, and more particularly to a method of producing a pattern used for molding, through the full mold process, a pressing die for pressing an auto motive body panel or the like.

2. Description of the Relevant Art

FIG. 9 of the accompanying drawings shows a conventional press die assembly which has upper and lower pressing dies 100a, 100b and blank holders 101a, 101b disposed around the upper and lower pressing dies 100a, 100b, respectively. The blank holder 101b is supported on cushion pins 103 mounted on a press frame 102 and grips the peripheral edge of a steel sheet blank (not shown) to prevent the steel sheet blank from developing wrinkles. The lower pressing die 100b has a shaping panel 104 for being pressed against the lower surface of the steel sheet blank, an attachment panel 105 fixedly mounted on the press frame 102, and ribs 106 interconnecting the panels 104, 105.

One known method of designing such a pressing die is disclosed in Japanese Laid-Open Patent Publication No. 62-182806 published Aug. 11, 1987. According to the disclosed method, when certain conditional data on a pressing die which is to be produced are entered, then other configurations of the pressing die are automatically determined. For example, when the type and position of bolts to be attached to die plates are specified, the configuration of the bolts and the machined shape of the die plates are automatically displayed on a CRT, and NC (numerical control) data for machining the die plates are automatically prepared.

Japanese Laid-Open Patent Publication No. 62-14208 published Jan. 22, 1987 also discloses an automatic NC data generating system, which is however not specifically addressed to the design of dies. According to the disclosed system, NC data such as a laser output, a machining speed, a pulse condition, etc. are automatically generated simply by selecting certain required data on a product to be laser-machined, such as the material and thickness of the product, the accuracy with which the product is to be machined, etc.

The full mold process has heretofore been employed to produce a molded die regardless of whether the die is designed by CAD (computer-aided design) or a manual designing process. In the full mold process, a pattern having the same shape as the shape of a die to be produced is prepared by cutting a plate-like blank made of a material such as foamed styrene into parts, assembling them into one pattern blank, and forming curved surfaces on the pattern blank by profiling. The produced pattern is then embedded in resin sand whose sand particles are coated with resin. Molten metal is then poured into the pattern, which is eliminated and replaced with a die having the same shape as that of the pattern.

The ribs 106 (FIG. 9) should best be positioned such that they will most effectively bear the pressing force which is applied from the upper die 100a through the steel sheet blank to the shaping panel 104 of the lower die 100b. More specifically, the outer rib 106 should extend downwardly from the outermost edge of the shaping panel 104 as indicated by the imaginary lines 106'.

If the outer rib were positioned so as to extend downwardly from the outermost edge of the shaping panel 104, however, the rib would interfere with the cushion pins 103 which are positionally inherent in the press frame 102. Therefore, the ribs must be disposed between the cushion pins 103, and are not optionally positioned. In order for the ribs 106 to withstand the applied pressing force, the ribs 106 should be large in wall thickness, and hence the ribs 106 are not of optimum shape and the die 100b has a large weight.

The pattern to be used in the full mold process has a surface corresponding to the reverse side of the shaping panel 104, and such a surface cannot easily be finished by machining. The molded die is required to be of a wall thickness large enough to give sufficient mechanical strength to the molded die. The surface of the pattern corresponding to the reverse side of the shaping panel 104 is irregular or rough as it is not machined, and hence the thickness of the shaping panel 104 is irregular. This also results in an increase in the weight of the die 100b.

To produce those parts of the pattern which cannot be machined, a plate-like blank having the same thickness as that of a rib, for example, is marked to actual parts dimensions and then cut into components, e.g., several hundred components in the case of the die 100b, and the components are then manually bonded together. This manual process requires much skill and many production steps, is highly costly due to required manual labor, and requires a long period of time to complete one pattern.

The present invention has been made in an effort to effectively solve the aforesaid problems of the conventional methods of producing patterns for molding castings.

SUMMARY OF THE INVENTION

It is an object of the present invention to provide a method of producing a pattern capable of casting a pressing die which includes ribs located in optimum positions and a shaping panel of an appropriate thickness, and has any weight increase minimized.

According to the present invention, the above object can be achieved by a method of producing a pattern for molding a die having a shaping panel and an attachment panel, the method comprising the steps of drawing a first rib figure extending from the shaping panel of the die based on configuration figure data which are entered manually or through data transfer into a computer-aided design system based on the configuration of a product, drawing a second rib figure extending from the attachment panel of the die in view of a relationship to a press machine which incorporates the die, joining the first and second rib figures to each other thereby drawing an entire die figure, dividing the entire die figure into plurality of block figures and generating machining data for the respective block figures, producing a plurality of blocks based on the machining data, and joining the blocks into a pattern.

According to the present invention, there is also provided a method of producing a pressing die, comprising the steps of compacting a refractory material around a pattern made of a material which can be eliminated by contact with molten metal, and pouring molten metal into the pattern, the pattern being constructed of a plurality of individually prepared blocks which are joined together.

According to the present invention, there is also provided a pressing die comprising a shaping panel for being pressed against a blank, a first rib extending from the shaping panel, an attachment panel adapted to be mounted on a press machine frame, a second rib extending from the attachment panel, and an intermediate portion extending between the shaping panel and the attachment panel and joining the first and second ribs to each other.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

A method of producing a pattern for molding castings according to the present invention is carried out according to a process shown in FIGS. 1 through 4.

Figure 1:
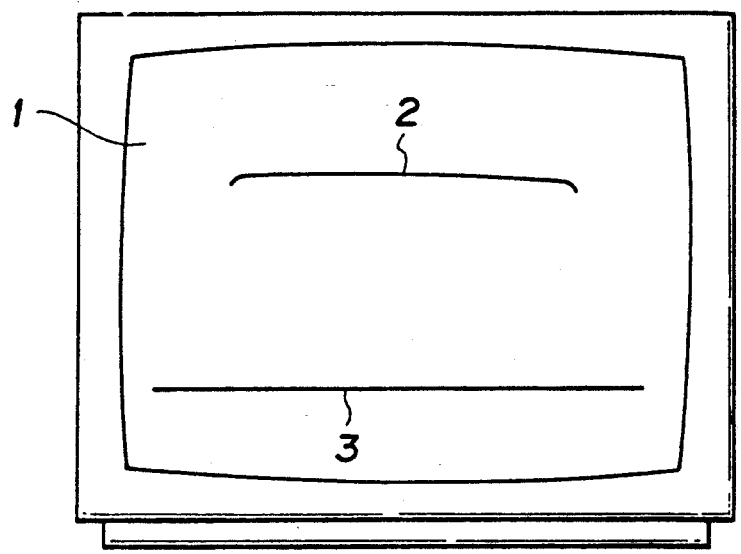
FIGS. 1 through 3 are views showing a process of designing the position and shape of ribs, the process being employed to carry out a method of producing a pattern for molding castings according to the present invention.
Figure 2:
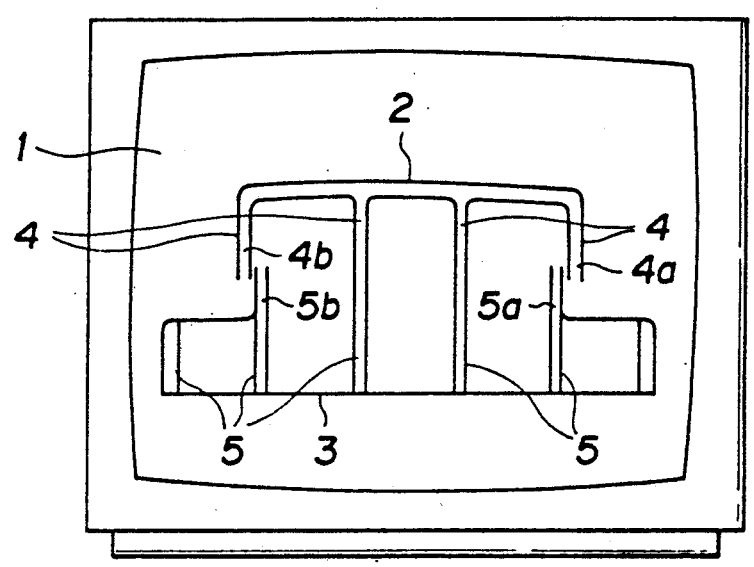

As shown in FIG. 1, when existing product configuration data such as automotive body roof configuration data are entered into a designing system, a FIG. 2 of the shaping panel of a pressing die to be molded is displayed on the screen 1 of a CRT or the like. A FIG. 3 of an attachment base to be attached to a press frame is also displayed. Then, as shown in FIG. 2, a rib FIG. 4 is drawn from optimum positions on the FIG. 2 based on the configuration of the shaping panel. While only the cross-sectional figures are shown in FIG. 2, plan figures are also drawn on the display with respect to the parts shown in FIG. 2 and also other parts shown in FIG. 3. Simultaneously with the display of the rib FIG. 4, a rib FIG. 5 is drawn from optimum positions on the FIG. 3. Since the rib FIGS. 4, 5 are independently drawn from the optimum positions on the FIGS. 2, 3, respectively, displayed ribs 4a, 5a and 4b, 5b tend to be positioned out of alignment with each other, as shown in FIG. 2.

Figure 3:
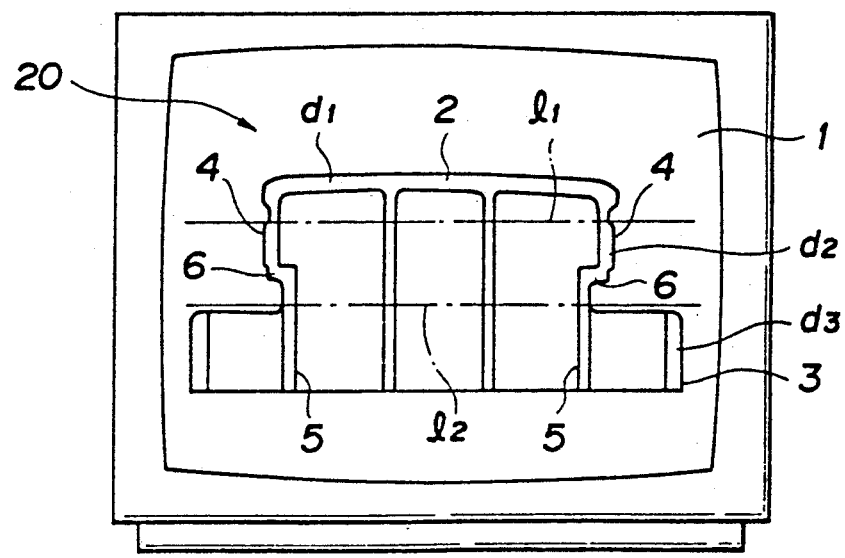
Figure 4A:
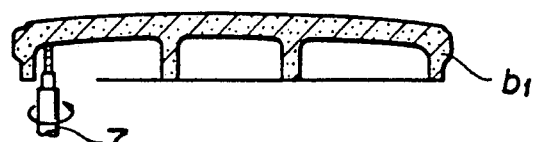
FIGS. 4A, 4B, and 4C are cross-sectional views of divided blocks, respectively, of the pattern.
Figure 4B:
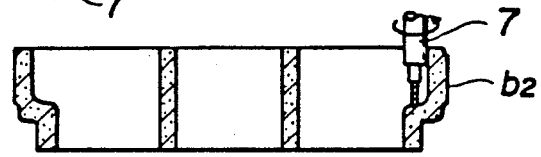
Figure 4C:
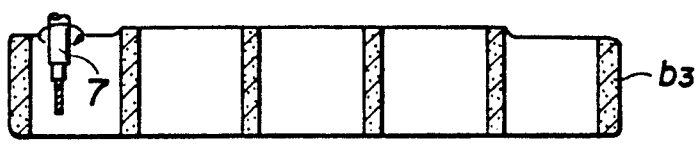
Figure 5:
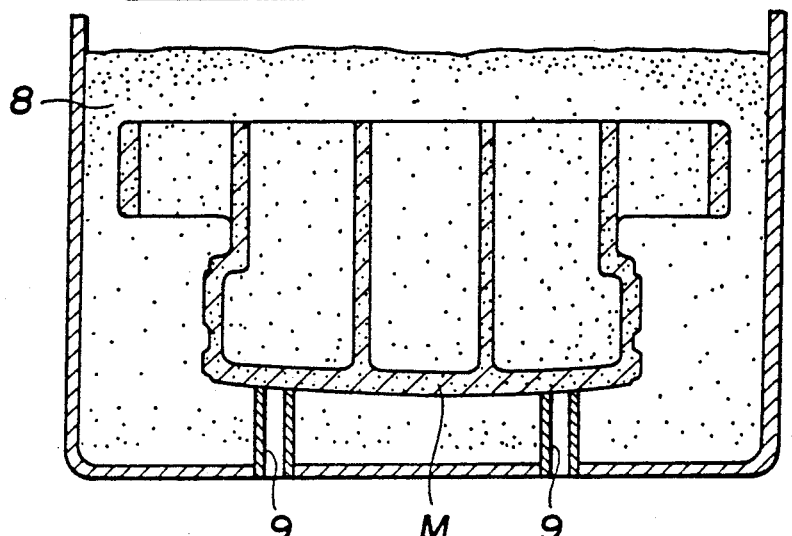
FIG. 5 is a cross-sectional view showing the manner in which a pressing die is molded using the pattern.
Figure 9:
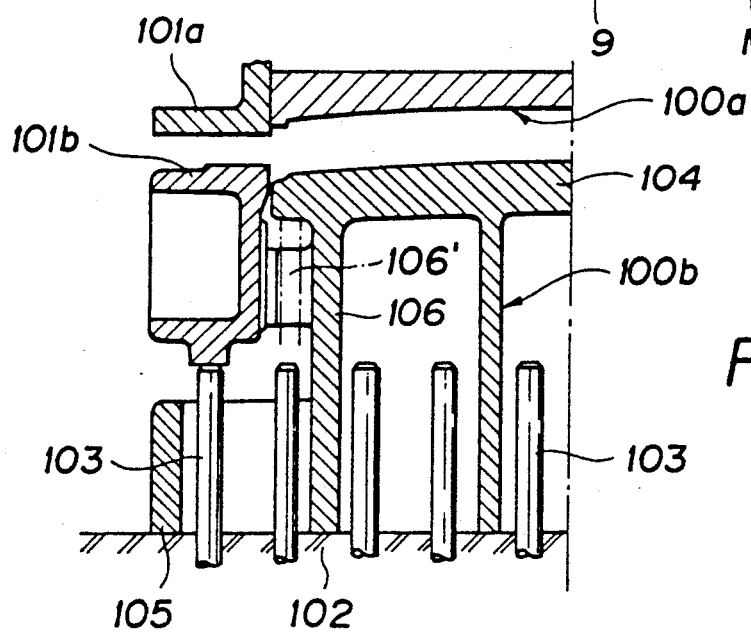
FIG. 9 is a fragmentary cross-sectional view of a conventional press die assembly.
Figure 6:
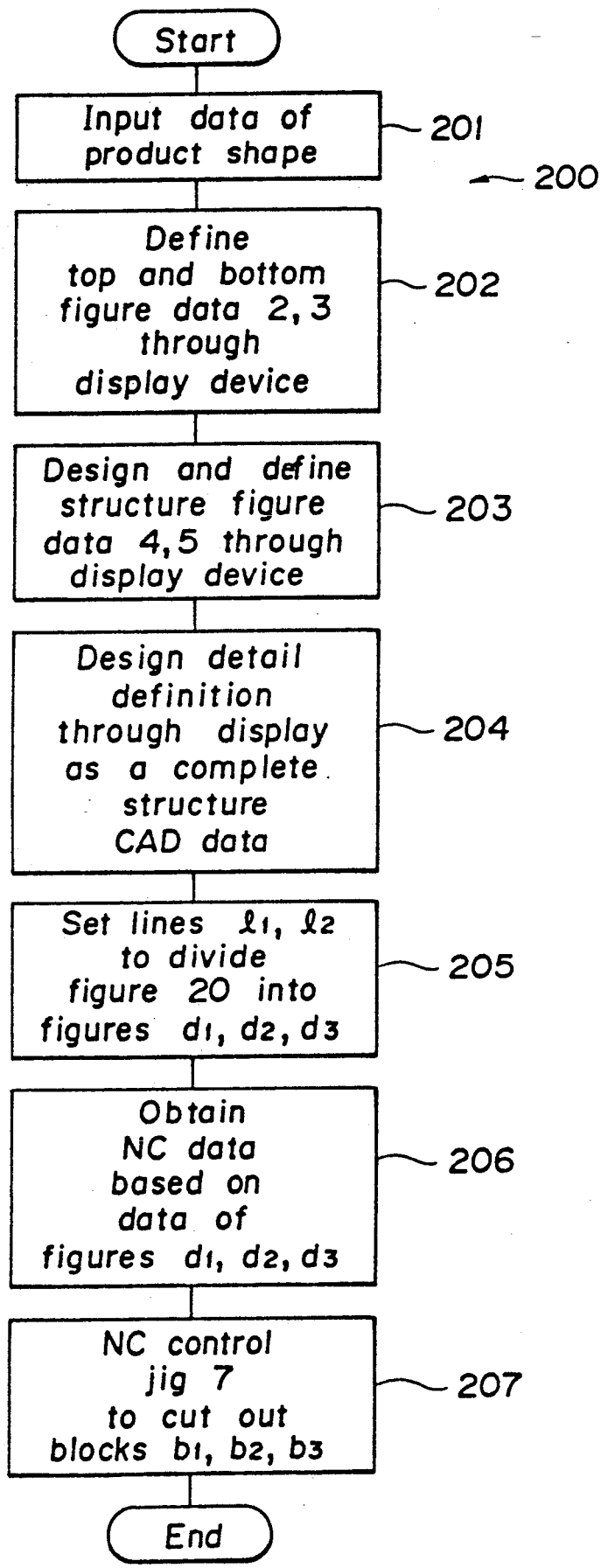
FIG. 6 is a flowchart of the process of designing the position and shape of ribs.

Then, as illustrated in FIG. 3, an intermediate rib FIG. 6 which optimally interconnects the rib FIGS. 4, 5 is drawn. As a result, an entire FIG. 20 showing the optimum configuration of a pressing die, including plan and cross sectional figures (not shown), is completed as CAD system data, and can be monitored on the display.

After the entire optimum configuration of the pressing die has been completed as CAD system data, two horizontal parting lines 11, 12 are established to allow a pattern to be machined by a machining tool with utmost ease. The entire FIG. 20 is then divided into three block figures d1, d2, d3 by the parting lines 11, 12, and machining data for the blocks d1, d2, d3 are prepared. While the figure 20 is divided into the three block figures d1, d2, d3 by the two horizontal parting lines 11, 12 in the illustrated embodiment, the number and direction of parting lines may freely be selected insofar as the divided blocks can be machined by a machining tool.

Then, as shown FIGS. 4A, 4B, and 4C, a machining tool 7 is numerically controlled based on the machining data on the divided block figures d1, d2, d3 to cut blocks b1, b2, b3 out of a blank of foamed styrene or the like. The blocks b1, b2, b3 are identical in shape and dimensions to corresponding portions of a pressing die to be molded. The blocks b1, b2, b3 are joined together into a pattern M as shown in FIG. 5. Therefore, the pattern M has the same shape and dimensions as those of the pressing die to be molded.

The figures as shown in FIGS. 1, 2, and 3, and the pattern blocks as shown in FIGS. 4A, 4B, and 4C can be drawn and cut out by a pattern production system controlled by a computer (not shown). This CAD system executes a process 200 shown in FIG. 6.

Existing product shape data are entered in a step 201, and then the shaping panel FIG. 2 and the attachment base FIG. 3 for a pressing die to be molded are then defined or entered in a step 202 as CAD system data in such forms that can be confirmed on the CRT screen 1.

The rib FIGS. 4, 5 are then drawn from the optimum positions on the FIGS. 2, 3 in a step 203. In a next step 204, the intermediate rib FIG. 6 is drawn which optimally joins the rib FIGS. 4, 5 to each other, so that the entire FIG. 20 representing the optimum pressing die configuration is completed as CAD system data on the CRT screen 1.

Two horizontal parting lines 11, 12 are then drawn on the completed entire FIG. 20 in a step 205, thus dividing the FIG. 20 into three block figures d1, d2, d3. NC machining data for producing blocks b1, b2, b3 based on the dimensions of the block figures d1, d2, d3 are prepared and stored in a step 206.

Thereafter, the machining tool 7 is operated under NC commands based on the NC machining data to cut blocks b1, b2, b3 out of a blank in a step 207.

The blocks b1, b2, b3 thus produced are then joined together into a pattern M. This step of joining the blocks b1, b2, b3 together may be included in the process 200 shown in FIG. 6.

Figure 7:
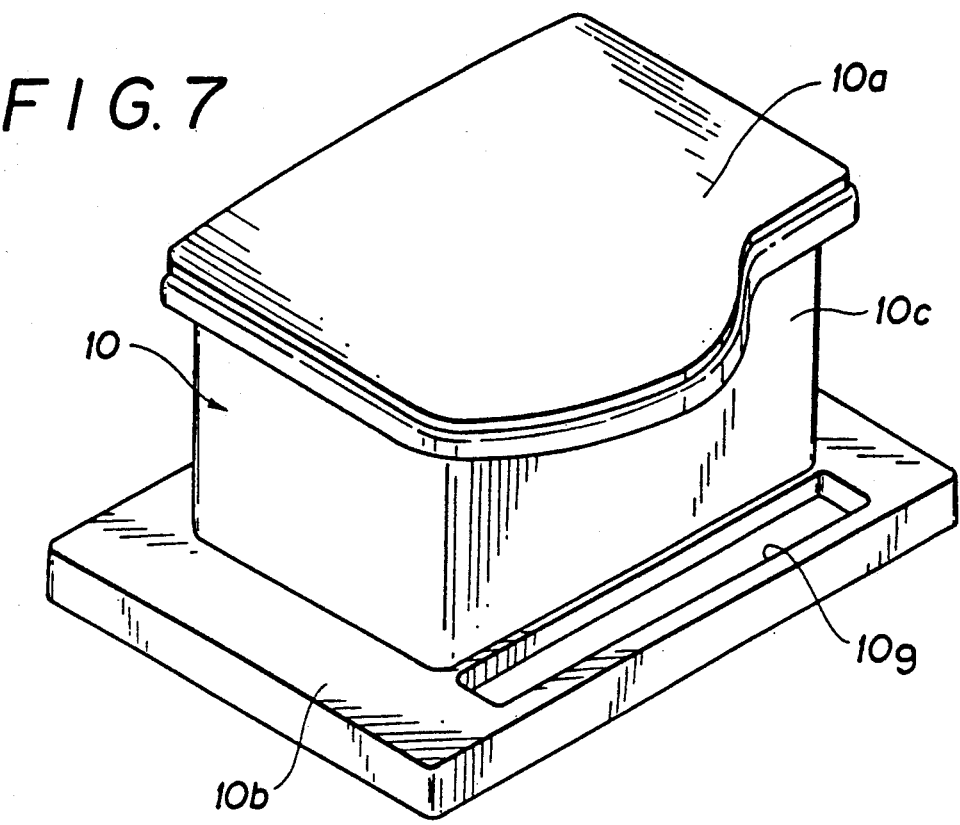
FIG. 7 is a perspective view of the pressing die molded as shown in FIG. 5.

As shown in FIG. 5, the pattern M is embedded in a mass of resin sand 8 which is a refractory material, and the resin sand 8 is compacted around the pattern M. Then, molten metal is poured from lower inlets 9 into the pattern M. The pattern M, being made of foamed styrene or the like, is progressively eliminated as a gas by the heat of the molten metal, slightly ahead of the ascending level of molten metal, thereby defining a mold cavity in the mass of resin sand 8. By pouring the molten metal until the space occupied by the pattern M is fully filled with the molten metal, a lower pressing die 10 shown in FIG. 7 is molded, the lower pressing die 10 being the same in shape and dimensions as the pattern M. The lower die 10 has a shaping panel 10a, an attachment panel 10b, and ribs 10c interconnecting the panels 10a, 10b, the attachment panel 10b having holes 10g for insertion of cushion pins therethrough. The ribs 10c include ribs 10d extending downwardly from optimum positions on the shaping panel 10a, ribs 10e extending upwardly from optimum positions on the attachment panel 10b, and intermediate ribs 10f joining the ribs 10d, 10e together. These ribs 10c, 10e, 10f correspond respectively to the FIGS. 4, 5, 6 of the entire FIG. 20.

Figure 8:
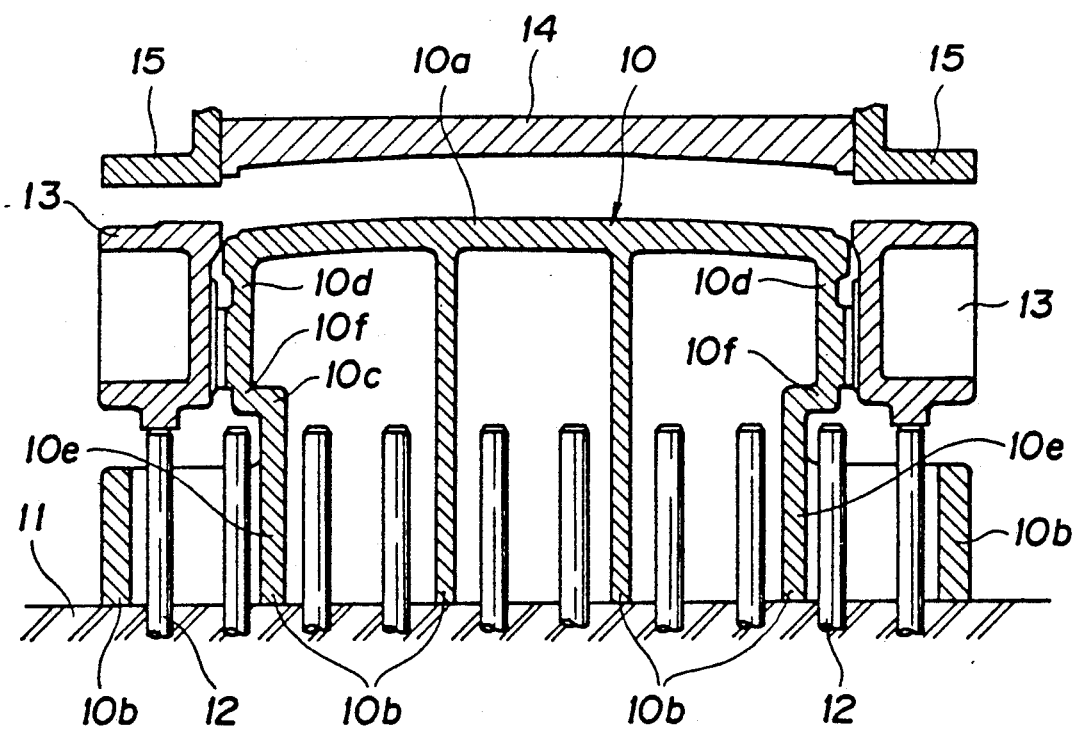
FIG. 8 is a cross-sectional view of a press die assembly including the pressing die shown in FIG. 7.

As illustrated in FIG. 8, the lower die 10 is mounted on a press machine frame 11. A lower blank holder 13 is disposed around the lower die 10 and supported on cushion pins 12. An upper die 14 and an upper blank holder 15 are disposed above the lower die 10. The dies 10, 14, the blank holders 13, 15, and the cushion pins 12 jointly constitute a press die assembly.

With the present invention, as described above, to produce the pattern M for molding the pressing die 10, the configuration of the pattern M is determined by die design data produced by the CAD system. The optimum configuration of the pattern M with the rib FIGS. 4, 5, 6 provided in their optimum positions and having optimum thicknesses and also with the shaping panel FIG. 2 having an optimum thickness, can easily be determined. As a consequence, the die 10 with any weight increase minimized can be molded using the pattern M.

For producing the pattern M, the optimum configuration 20 is divided into the block figures d1, d2, d3 each allow easy machining, and NC machining data are prepared from the block figures d1, d2, d3 within a short period of time. Therefore, the blank mass can easily be machined by the machining tool 7 based on the NC machining data to produce blocks b1, b2, b3.

In the illustrated embodiment, the blocks b1, b2, b3 are bonded together into the pattern M, and molten metal is poured once to produce the lower die 10.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

We claim:

1. A method of producing a pattern for casting a die having a shaping panel and an attachment panel, said method comprising the steps of:

drawing a first rib figure including a plurality of first ribs extending from the shaping panel of the die based on configuration figure data which are entered manually or through data transfer to a computer-aided design system based on the configuration of a product to be shaped by said shaping panel;

drawing a second rib figure including a plurality of second ribs extending from the attachment panel of the die based on the structure of a press machine which incorporates the die;

drawing an intermediate section which joins said first and second rib figures to each other thereby drawing and entire die figure;

dividing said entire die figure into a plurality of block figures and generating machining data for the respective block figures;

said entire die figure being divided into said block figures by at least one parting line extending in such a direction that each of said blocks can be fully machined from a foam blank by a machining tool;

producing a plurality of blocks from the foam blank based on said machining data; and joining said blocks into a pattern corresponding to said entire die figure.

2. A method of claim 1, wherein said first rib figure and said second rib figure are disposed in a vertically spaced relationship; and said entire die figure is divided into said block figures by at least one horizontal parting line extending through at least one of said first rib figure, said second rib figure and said intermediate section.

3. A method of producing a pattern for casing a pressing die having a shaping panel for being pressed against a blank to be pressed into a product and an attachment panel to be mounted on a press machine frame, said method comprising the steps of:

drawing a figure corresponding to the shaping panel and a figure corresponding to the attachment panel based on the configurations of the product and the pressing machine frame, respectively;

drawing figures of first ribs extending from optimum positions on said figure corresponding to the shaping panel and figures of second ribs extending from optimum positions on said figure corresponding to the attachment panel; and drawing figures of third ribs which optimumly join said figures of said first and second ribs, including those figures of said first and second ribs which are out of alignment with each other, thereby completing an entire figure corresponding to the pattern.

4. A method according to claim 3, further including the steps of:

dividing said entire figure into a plurality of block figures each corresponding to a block which can be easily, fully machined from a foam blank by a machining tool;

preparing machining data for producing corresponding blocks of the pattern from said block figures; and producing said blocks from said foam blank based on said machining data.

* * * * *

UNITED STATES PATENT AND TRADEMARK OFFICE
CERTIFICATE OF CORRECTION

PATENT NO. : 5,072,782

DATED : December 17, 1991

INVENTOR(S) : Takaoki Namba et al.

It is certified that error appears in the above-identified patent and that said Letters Patent is hereby corrected as shown below:

Column 6, line 5, change "and" to -- an --.

Signed and Sealed this

Ninth Day of March, 1993

Attest:

STEPHEN G. KUNIN

Attesting Officer

Acting Commissioner of Patents and Trademarks